(12) United States Patent
Gao

(10) Patent No.: US 8,262,758 B2
(45) Date of Patent: Sep. 11, 2012

(54) METHOD AND EQUIPMENT FOR MAKING ABRASIVE PARTICLES IN EVEN DISTRIBUTION, ARRAY PATTERN AND PREFERRED ORIENTATION

(75) Inventor: Weixing Gao, Jiangsu (CN)

(73) Assignee: Jiangsu Tianyi Micro Metal Powder Co., Ltd., Huanghuatang Industry Zone, Xuyi Country, Huai An Jiangsu (CN)

( * ) Notice: Subject to any disclaimer, the term of this patent is extended or adjusted under 35 U.S.C. 154(b) by 908 days.

(21) Appl. No.: 12/115,474

(22) Filed: May 5, 2008

(65) Prior Publication Data

US 2008/0289262 A1    Nov. 27, 2008

(30) Foreign Application Priority Data

May 23, 2007   (CN) .......................... 2007 1 0022816

(51) Int. Cl.
*B24D 3/14*   (2006.01)
*C09C 1/68*   (2006.01)
*C09K 3/14*   (2006.01)
*B05C 11/02*   (2006.01)

(52) U.S. Cl. ......................................... 51/309; 118/640

(58) Field of Classification Search ............ 51/307–309; 118/640

See application file for complete search history.

(56) References Cited

U.S. PATENT DOCUMENTS

| | | | | |
|---|---|---|---|---|
| 1,930,788 A | * | 10/1933 | Buckner | 264/430 |
| 3,922,589 A | * | 11/1975 | Peckingham | 318/126 |

* cited by examiner

*Primary Examiner* — Shuangyi Abu Ali
(74) *Attorney, Agent, or Firm* — Global IP Services; Tianhua Gu

(57) ABSTRACT

An equipment for making abrasive particles in even distribution, array pattern and preferred orientation comprises an adsorbing releasing apparatus being composed of a plurality of acicular soft magnetic metallic sticks, an upper and a lower stators, and a plurality of windings. Each winding forms an electric circuit through a electrical source, a resistance, and a switch a plurality of blind holes being distributed on face of the blind hole feeding tropism board. Using electric current to form magnetic field for the acicular soft magnetic metallic sticks absorb or release abrasive particles plated with soft magnetic materials. The equipment is simple, convenient in operation, high in efficiency and reliability. The equipment makes abrasive particles in matrix with an ideal state in distributing density, uniformity, arrange, and tropism. Thereby, the function of the abrasive materials is fully exerted and the life of products is prolonged.

5 Claims, 3 Drawing Sheets

METHOD AND EQUIPMENT FOR MAKING ABRASIVE PARTICLES IN EVEN DISTRIBUTION, ARRAY PATTERN AND PREFERRED ORIENTATION

CROSS REFERENCE TO RELATED APPLICATION

This application claims the priority of Chinese patent application No. 200710022816.4 filed on May 23, 2007, which is incorporated herein by reference.

FIELD OF THE INVENTION

This invention relates to equipment for making abrasive particles in even distribution, array pattern and preferred orientation. Especially, relates to a method that turning on or turning off electric current makes a plurality of acicular soft magnetic metallic sticks carrying magnetic field or losing magnetic field thereby absorbs or drops abrasive particles plated with soft magnetic materials to actualize the even distribution, array pattern and prepared orientation of abrasive particles.

BACKGROUND OF THE INVENTION

Techniques for making traditional abrasive products such as diamond abrasive wheel, abrasive cutting as knife-edge, and grinding products are that first mix abrasive material as agglomerate, and then sinter them together. The distribution of abrasive particles in the agglomerate is in a random state. There are many shortages for this kind of products, such as uneven distribution of abrasive materials, accumulation, partial separating out, etc. and results wasting of abrasive materials, shortening of product life as well as reducing of work efficiency.

In recent years, in order to solve above-mentioned problems and achieve an ideal state in arrangement, tropism, density and uniformity for abrasive particles being distributed in a matrix, many methods are adopted, such as laying particles by manual work, brazing, templates, negative pressure adsorption method, etc. However, the above-mentioned methods are deficient. For example, the manual method is very time-consuming and cannot be used in large-scale manufacture. In the process of brazing method, temperature is so high that the solder is melted to drive abrasive particles displacement; it results in heaping, uneven distribution, and bed tropism. Template layout method cannot dispose abrasive particles to a right position, still have displacement and heaping when laying abrasive materials. Glue water method needs complex equipment. Also, glue water method will pollute abrasive particles and matrix. Negative pressure adsorption method needs complex equipment too, as the abrasive particles have special and differ shape, the acetabula is hard to satisfy the requirements of products.

SUMMARY OF THE INVENTION

The purpose of this invention is to provide method and equipment for making abrasive particles in even distribution, array pattern and preferred orientation.

A method for making abrasive particles in even distribution, array pattern and preferred orientation that plate magnetic abrasive particles with soft magnetic materials; turning on or turning off electric current makes a plurality of acicular soft magnetic metallic sticks carrying magnetic field or losing magnetic field thereby absorbs or drops abrasive particles plated with soft magnetic materials to actualize the even distribution, array pattern and prepared orientation of abrasive particles. Discretionarily assemble arrangements of density, figure, number, and laying area of the acicular soft magnetic metallic sticks wound with winding according to requests of products.

An Equipment for making abrasive particles in even distribution, array pattern and preferred orientation of abrasive particles comprises an adsorbing releasing apparatus and a blind hole feeding tropism board. The adsorbing releasing apparatus is composed of a plurality of acicular soft magnetic metallic sticks, an upper and lower stators, and a plurality of windings. The winding is wound on each acicular soft magnetic metallic stick. The plurality of acicular soft magnetic metallic sticks is fastened by the upper and lower stators. Each winding forms an electric circuit through an electrical source, a resistance, and a switch. Whole components constitute an adsorbing releasing apparatus. A plurality of blind holes is distributed on the face of the blind hole feeding tropism board.

In the equipment of the present invention, in order to increase the accuracy of operation a positioned control is set at the side of the blind hole feeding tropism board and a die to make the adsorbing or releasing apparatus more quick and accurate when aiming.

In the equipment of the present invention, the nonmagnetic material for stators is hard plastic, wood, aluminum, or copper.

In the equipment of the present invention, the arrangements of the density, figure, number, and laying area of the acicular soft magnetic metallic sticks wound with winding can be assembled discretionarily according to request of products.

In the equipment of the present invention, the figure of blind hole on blind hole feeding tropism board is determined by the tropisms of abrasive particles in products and by the figures of abrasive particles. The arrangements of the density, figure, number, and laying area of the blind holes on the blind hole feeding tropism board are corresponding to the acicular soft magnetic metallic sticks.

In the equipment of the present invention, the blind hole feeding tropism board is made by nonmagnetic material, such as hard plastic, wood, aluminum, or copper.

The equipment of the present invention can be used for other magnetic particles or particles plated with magnetic materials for their even distribution, array pattern or preferred orientation.

The equipment of the present invention uses electric current to form magnetic field to absorb or release abrasive particles plated with soft magnetic materials. The equipment is simple, convenient in operation, high in efficiency and reliability. The equipment makes abrasive particles in matrix with an ideal state in distributing density, uniformity, arrange, and tropism. Thereby, the function of the abrasive materials is fully exerted and the life of products is prolonged.

In the figures: 1. Acicular Soft Magnetic Metallic Stick, 2. Winding, 3. Nether Stator of Soft Magnetic Metallic Stick, 4. Upper Stator of Soft Magnetic Metallic Sticks, 5. Power, 6.

Resistor, 7. Switches, 8. Blind Hole, 9. Positioned Control, 10. Blind hole feeding tropism board.

DETAIL DESCRIPTION OF THE INVENTION

With reference to the attached drawings and the embodiments of the present invention, the equipment of the present invention is explained as follows.

Figure 1:
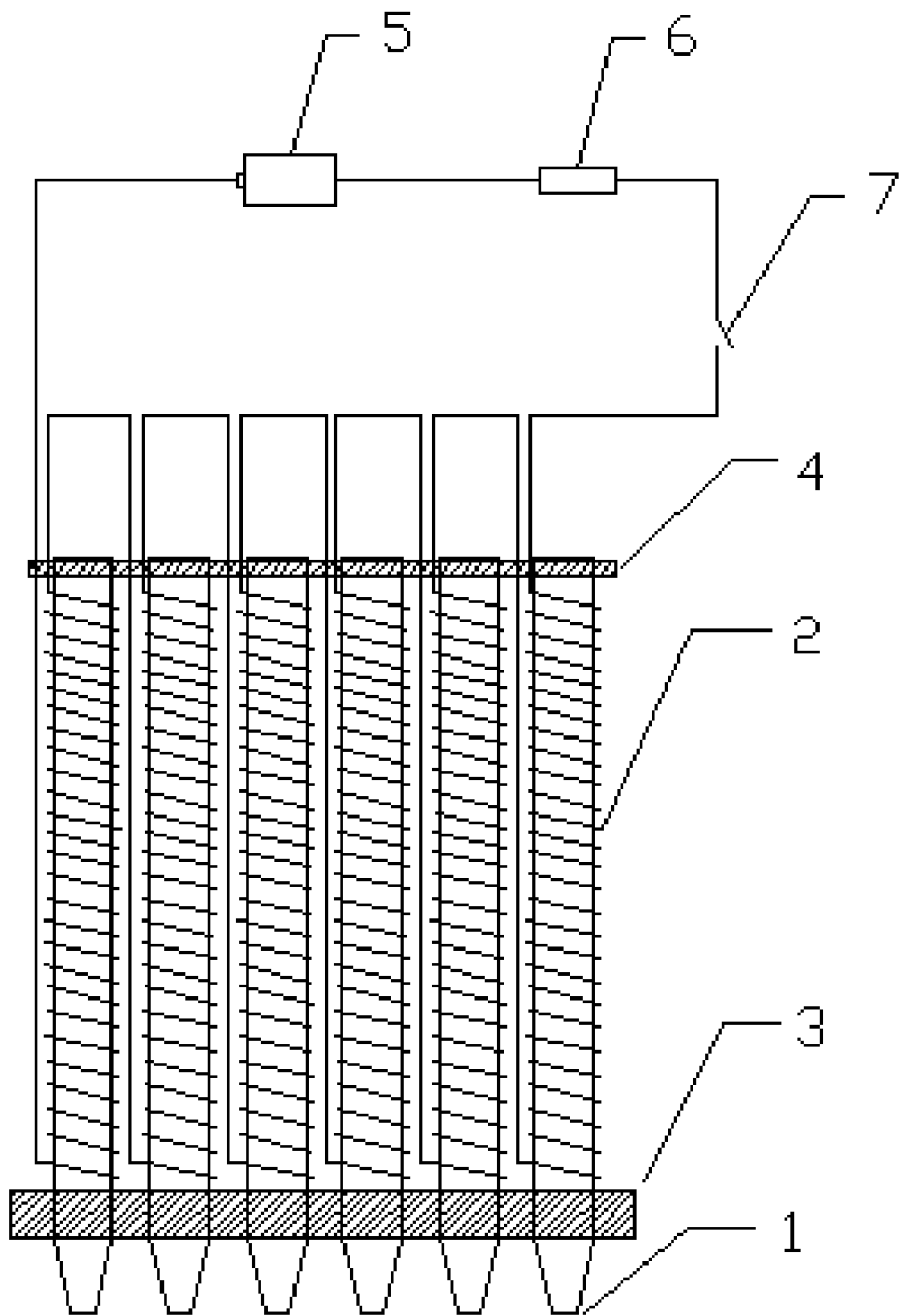
FIG. 1 is a sketch of a quadrate adsorbing releasing apparatus.
Figure 2:
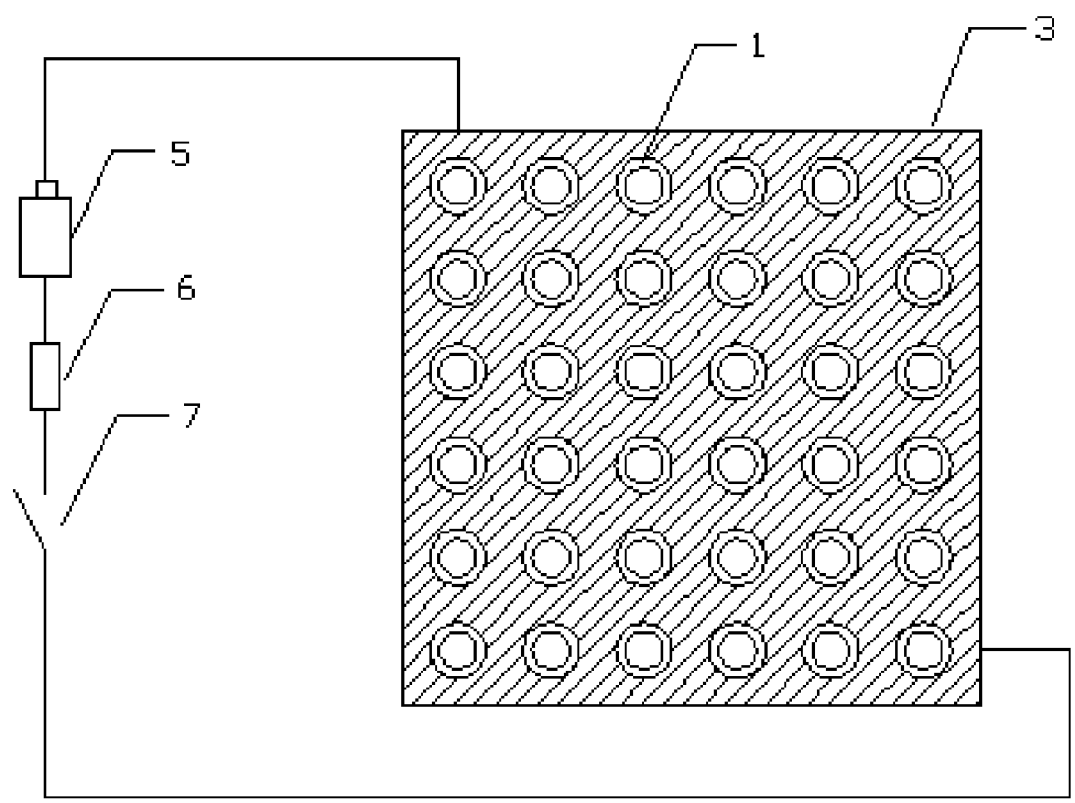
FIG. 2 is a top view of the FIG. 1.
Figure 3:
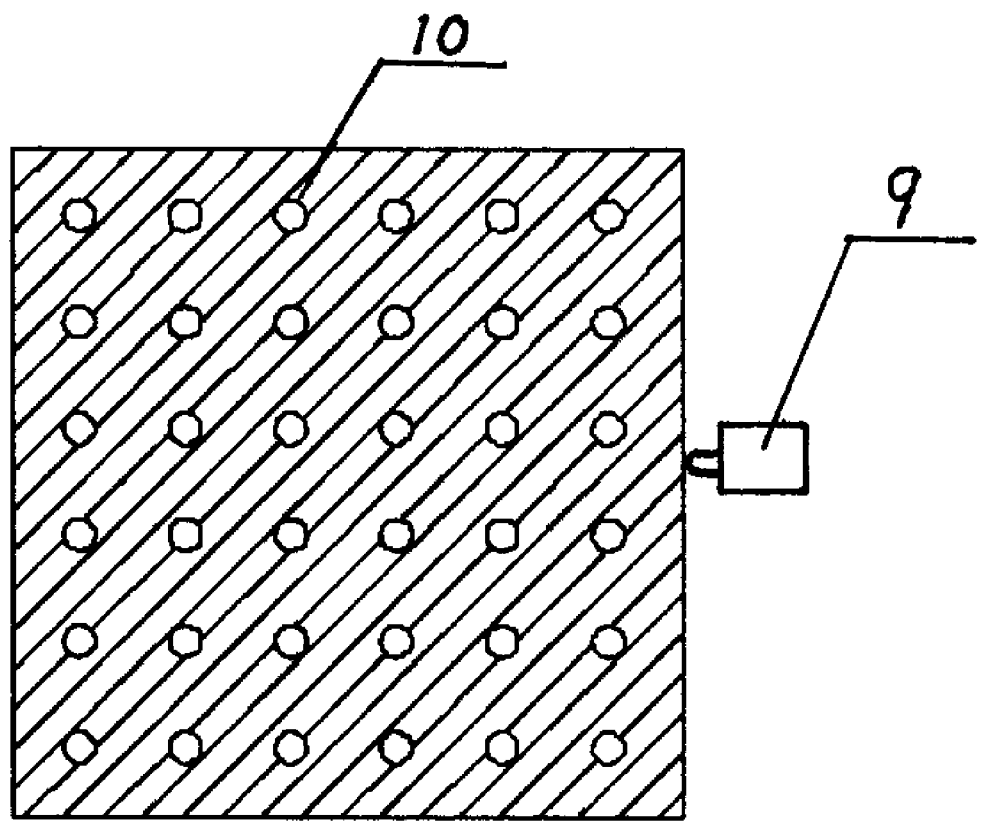
FIG. 3 is a sketch of the blind hole feeding tropism board.
Figure 3:
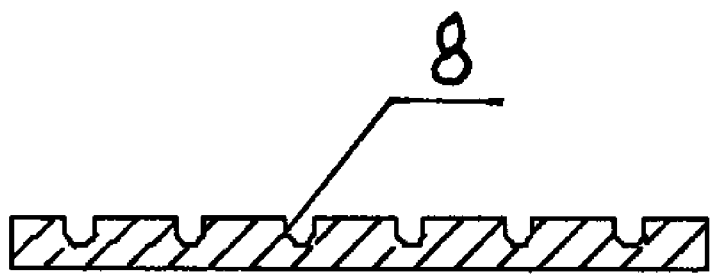

Refer to FIGS. 1, 2 and 3; this device is composed of an absorbing releasing apparatus, and a blind hole feeding tropism board. The absorbing releasing apparatus is composed of a plurality of acicular soft magnetic metallic sticks 1, a nether stator of soft magnetic metallic stick 3, an upper stator of soft magnetic metallic sticks 4 and windings 2. Each acicular soft magnetic metallic stick is wound with a winding 2. The plurality of acicular soft magnetic metallic sticks is fixed on the upper and nether stators of soft magnetic metallic sticks. The winding 2, power supply 5, resistor 6 and switch 7 form an electric circuit. All above mentioned parts compose of the absorbing releasing apparatus. The blind holes 8 are distributed on the blind hole feeding tropism board 10.

In order to improve operation accuracy for the equipment of the present invention, a positioned control 9 is set at the sides of the blind hole feeding tropism board 10 and a die to make the adsorbing releasing apparatus more quick and accurate when aiming.

In the equipment of the present invention, the nonmagnetic material for upper or nether stator 3, 4 is hard plastic, wood, aluminum or copper.

In the equipment of the present invention, the arrangements of the density, figure, number, and laying area of the acicular soft magnetic metallic sticks 1 wound with winding 2 can be assembled discretionarily according to the request of products.

In the equipment of the present invention, the arrangements of the density, figure, number, and laying area of the blind holes 8 on the blind hole feeding tropism board 10 are corresponding to the acicular soft magnetic metallic sticks 1.

In this invention, shape of the blind hole 8 on blind hole feeding tropism board 10 can be determined according to the orientation of the abrasive particles in the product and shape of the abrasive particle.

In this invention, said blind hole feeding tropism board 10 is made of one of hard plastics, wood, aluminum or copper non-magnetic material.

What is claimed is:

1. An equipment for adding abrasive particles into a mold in even distribution, array pattern and orientation comprising: an adsorbing releasing apparatus and a blind hole feeding tropism board; said adsorbing releasing apparatus being composed of a plurality of acicular soft magnetic metallic sticks, an upper and a lower nonmagnetic material stators, and a plurality of windings; the plurality of windings being wound on the plurality of acicular soft magnetic metallic sticks respectively to form a plurality of electromagnets; said plurality of electromagnets being fastened by said upper and lower stators; each electromagnet forming an electric circuit through a electrical source, a resistance, and a switch; a plurality of blind holes being distributed on face of the blind hole feeding tropism board; arrangements in density, figure, number, and laying area for said plurality of electromagnets can be assembled discretionarily according to requests of products; arrangements of the density, figure, number, and laying area of the blind holes on said blind hole feeding tropism board are corresponding to the arrangements of the plurality of electromagnets.

2. The equipment of claim 1, wherein for improving operation accuracy a positioned control and a die are set beside the sides of said blind hole feeding tropism board.

3. The equipment of claim 1, wherein the nonmagnetic material for the upper or lower stator is hard plastic, wood, aluminum or copper.

4. The equipment of claim 1, wherein the shape of the blind holes on said blind hole feeding tropism board is determined according to the orientation of the abrasive particles in products and the shape of the abrasive particles.

5. The equipment of claim 1, wherein said blind hole feeding tropism board is made of non-magnetic material of hard plastic, wood, aluminum or copper.

\* \* \* \* \*